March 25, 1930.  J. HARRINGTON  1,751,629
THEFT PREVENTING DEVICE
Filed May 21, 1927
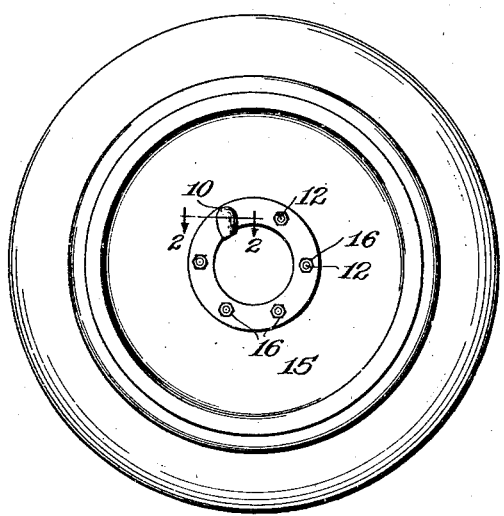
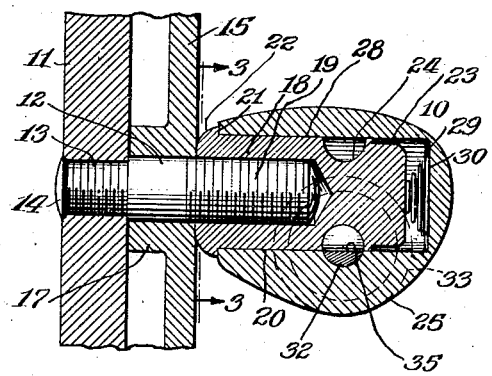
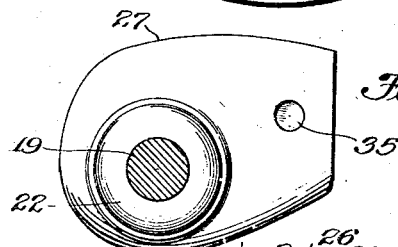
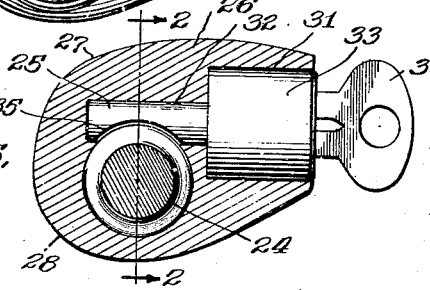
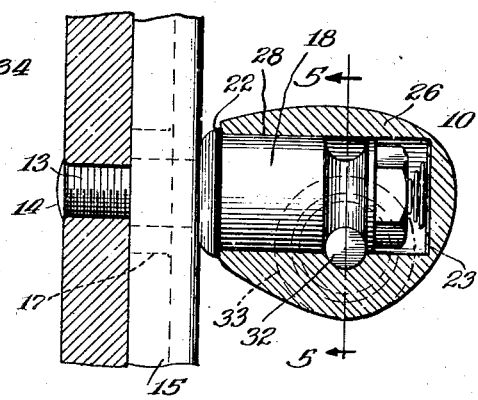
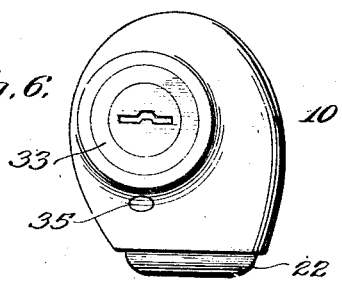
Inventor
James Harrington
By Williams, Bradbury,
McCabe & Hinkle Attys.

Patented Mar. 25, 1930

1,751,629

UNITED STATES PATENT OFFICE

JAMES HARRINGTON, OF CHICAGO, ILLINOIS, ASSIGNOR TO PINES WINTERFRONT COMPANY, OF CHICAGO, ILLINOIS, A CORPORATION OF DELAWARE

THEFT-PREVENTING DEVICE

Application filed May 21, 1927. Serial No. 193,087.

My invention relates to theft preventing devices, being more particularly concerned with locking devices for spare wheels of automobiles.

One of the objects of my invention is the provision of a novel and simple locking device for spare wheels or the like, including a threaded member for clamping the wheel upon a carrier and a casing which is mounted for free rotation upon said threaded member when in locked condition, which cannot be defeated by the application of wrenches or the like to exert twisting or bending forces, or both, simultaneously.

Another object of my invention is the provision of a novel and simple wheel lock assembly, including a threaded member adapted to be threaded upon a wheel carrier and locked by enclosing the same in a casing which is mounted for free rotation upon said threaded member when in locked condition, and which casing has a smooth and irregularly curved exterior surface of such shape as to render it impossible to effectively grip such casing with wrenches or the like for the purpose of exerting rotative and bending forces.

Another object of my invention is the provision of a lock of the class described which comprises a minimum of essential operating parts, thereby reducing the cost of manufacture and assembly and the possibility of moving parts getting out of order, and which also includes resilient means for preventing the rattling of parts, means for easily and quickly aligning detachable locking parts, and means for enclosing and journalling a rotatable locking bolt in such manner as to render the same practically unbreakable.

Other objects and advantages of my invention will appear more fully from the following description and from the accompanying drawings, in which similar characters of reference indicate similar parts throughout the several views.

Referring to the drawings,

Fig. 1 is an elevational view of a spare wheel and carrier, to which my lock is applied.

Fig. 2 is an enlarged, detail, cross sectional view on the line 2—2 of Fig. 1.

Fig. 3 is a side elevation of the lock in partial cross section, taken on the line 3—3 of Fig. 2, in inverted position.

Fig. 4 is an enlarged, detail view similar to Fig. 2, the lock casing alone being in cross section.

Fig. 5 is an enlarged, cross sectional view in the position of Fig. 3, taken on the line 5—5 of Fig. 4.

Fig. 6 is a plan view taken from the bottom in Fig. 1.

Referring to Figs. 1 and 2, 10 indicates, in its entirety, my locking device, and 11 indicates a fragmentary portion of a spare wheel carrier or the like, having a plurality of projecting stud bolts 12 which may be secured to the carrier 11 by threads 13 and riveting as at 14.

The bolts 12 are customarily located in position to be received in apertures in the conventional disc wheel 15, and the wheel is secured upon the carrier 11 by a plurality of nuts 16, one of which may be replaced by my locking device 10.

Referring to Figs. 2 and 4, 15 indicates a fragmentary portion of a disc wheel at the attaching flange of the wheel, having an aperture 17 which is adapted to receive the stud bolt 12. The locking device 10 comprises a threaded member 18 which is adapted to be threaded upon the end of the bolt 12, and which for this purpose has a threaded bore 19. The threaded bore 19 should be of sufficient length to receive the projecting end 12 of the bolts usually employed and clamp the disc wheel 15 against the carrier 11.

The threaded member 18 has a substantially cylindrical exterior surface 20 terminating at its open end in an outwardly extending flange which forms a shoulder 21, and the end surrounding the flange may be rounded, as shown at 22. The opposite end 23 of the threaded member 18 is non-circular in shape, being preferably of hexagonal form and reduced in size within the cylindrical surface 20.

Intermediate between the ends of the threaded member 18 is an annular groove 24 extending about the threaded member 18 and having a substantially semicircular cross section. The size of the groove 24 is that adapted to receive the locking bolt 25, further to be described.

The threaded member 18 is adapted to be used in a similar manner to any one of the nuts 16, clamping the disc wheel 15 upon the carrier 11 by means of any of the bolts 12, a wrench being applied to the hexagonal end 23. After the disc wheel has been firmly clamped by means of a wrench, the hexagonal surface 23 and the major part of the threaded member 18 are enclosed within a casing 26 which includes means for locking the casing upon the threaded member but permits free rotation of the casing upon the same.

The casing 26 comprises a metal member having a smooth exterior surface 27 which is irregularly curved so as to completely enclose the threaded member and locking mechanism, further to be described, and so as to present an irregular surface which is difficult to grip by means of a wrench or the like. The casing 26 is provided with a bore 28 of sufficient size to completely enclose the threaded member 18 to the shoulder 21, leaving a space 29 at the inner end of said bore for the reception of a spring 30.

The spring 30 may be retained in the bore 28 by the frictional engagement of the outer coils with the sides of the bore, and the spring is adapted to bear against the threaded member 18, being tensioned between the casing and said member to prevent rattling between these parts.

The casing 26 is also provided with a bore 31 transversely located relative to the bore 28 and having its axis at right angles to the axis of the bore 28. The bore 31 may be continued by a small counterbore 32 which intersects the bore 28 in such manner that the locking bolt 25, when in locked position as in Fig. 4, projects into the bore 28 by an amount sufficient to fill the groove 24.

The bore 31 and counterbore 32 are adapted to receive a lock barrel 33 having a rotatable locking bolt 25 projecting therefrom which is adapted to be rotated by means of a key 34. The lock barrel 33 may be retained in the bore 31 by a metal pin 35 extending through one side of the casing 26 into an aperture in the lock barrel in such manner that the lock barrel is permanently fastened in its bore and is prevented from rotating therein.

The locking bolt 25 is also provided with a transverse circular groove 35 which conforms to the curvature of the bore 28 and the cylindrical surface 20 when the locking bolt is in unlocked condition. The lock barrel 33 should also preferably be of the type from which the key 34 cannot be removed unless the locking bolt 25 is in locked condition, thereby preventing the separation of these parts which might lead to their loss while the locking device is removed from the carrier.

The operation of my locking device is as follows:

When the disc wheel 15 has been placed upon the bolts 12 of the carrier 11 and secured by the nuts 16, one of the nuts may be replaced by the threaded member 18 which may be screwed against the disc wheel by a wrench applied to the non-circular part 23. The threaded member 18 should preferably be screwed home very tightly so that the friction between the threaded member 18 and the disc wheel 15 will retain the threaded member in position.

The casing member 26 may then be placed in condition for receiving the threaded member 18 by turning the key and the locking bolt 25 to the position shown in Figs. 2 and 5, after which the casing 26 may be placed upon the threaded member 18, receiving the latter in the bore 20. As the locking bolt 25 has a groove 35 which registers with the wall of the bore 20 in the position of Fig. 2, the locking bolt will not interfere with the insertion of the threaded member 18 and the threaded member may be inserted freely, compressing the spring 30 in the space 29. The shoulder 21 upon the threaded member 18 will limit the inward movement of the threaded member into the casing 26 to the position where the annular groove 24 of the threaded member is aligned with the counterbore 32, and it will thus be observed that the shoulder 21 enables the exact alignment of the threaded member in the locking position.

The locking bolt may then be rotated within its counterbore 32 and within the annular groove 24 of the threaded member 18 by means of the key 34, and when the locking bolt has reached substantially the position of Fig. 4, the key may be withdrawn. The spring 30 will then press against the head 23 and the inside of the casing 26 and take up any play between the groove 24 and the locking bolt and prevent relative rattling of these parts. The casing 26 will then be rotatably mounted upon the threaded member 18 and, upon the application of rotative forces by a wrench or otherwise, the casing will rotate freely upon the threaded member without actuating the latter.

The casing 26, which surrounds the lock barrel 33 and the threaded member 18, is of irregular exterior shape, being curved as shown in Figs. 2 to 6, and the exterior surface 27 may be case hardened, if desired, to more readily resist the gripping action of toothed wrenches.

While I am aware that the conventional type of toothed wrench, known as the Stillson wrench, is adapted to grip cylindrical curved surfaces, it should be noted that such a wrench cannot be employed to defeat the lock of my invention because, when in locked condition, the casing 26 is freely rotatable upon the threaded member 18. Furthermore, it is impossible, with the aid of such a wrench, to exert both rotative force upon the casing 26 and an axial pull, because such an axial pull will cause the wrench to lose its grip, due to the irregular curved surface upon my locking device.

It will thus be observed that it is practically impossible to exert both a rotative force and an axial force upon the casing 26, such as might result in causing the locking bolt 25 to bind in the groove 24, transmitting rotative forces to the threaded member 18 to accomplish the unscrewing of this member.

Furthermore, my locking device embodies a casing of considerable mass which is adapted to protect the parts contained therein and which cannot be defeated by driving piercing instruments through the same into the threaded member 18.

It will thus be observed that I have invented a simple and effective locking device for spare wheels which includes but a few parts, eliminating many of the parts required where a different structure with a slidable lock bolt is employed. It will also be observed that my locking device cannot be defeated by the application of a wrench to exert both rotative and axial forces upon the enclosing casing and that, due to the simplicity of my device, it is more efficient, economical and easy to assemble than any other device of the prior art.

While I have illustrated and described a specific embodiment of my invention, many modifications may be made without departing from the spirit of the invention, and I do not wish to be limited to the precise details of construction set forth but desire to avail myself of all changes within the scope of the appended claims.

Having thus described my invention, what I claim as new and desire to secure by Letters Patent of the United States is:

1. In a theft preventing device, the combination of a substantially cylindrical member having a threaded aperture and a non-circular end, with a casing member having a bore to receive said cylindrical member, said casing member having a second transverse bore intersecting said first-mentioned bore and said cylindrical member having an annular groove and a lock barrel carried in said second bore having a rotatable locking bolt, said locking bolt being adapted to rotate into said annular groove, and said bolt having a groove adapted to permit passage of said cylindrical member when in unlocked position.

2. In a theft preventing device, the combination of a casing member having a bore in the same, a helical spring retained in said bore, a substantially cylindrical member in said bore against said spring, said cylindrical member having a threaded aperture in the same, a non-circular portion, and an annular groove about the same, said casing having a cross bore, and a shoulder on said cylindrical member bearing against a part of said casing to determine the registering position of said groove and cross bore.

3. In a theft preventing device, the combination of a casing member having a bore in the same, a helical spring retained in said bore, a substantially cylindrical member in said bore against said spring, said cylindrical member having a threaded aperture in the same, a non-circular portion, and an annular groove about the same, said casing having a cross bore, a shoulder on said cylindrical member bearing against a part of said casing to determine the registering position of said groove and cross bore, said casing having an enlarged bore axially extending out of said casing from said cross bore, and a lock barrel in said enlarged bore having a rotatable grooved locking bolt in said cross bore.

4. In a theft preventing device, the combination of a securing member having a threaded portion, a casing having a bore for rotatably receiving said securing member, means for rotatably retaining said securing member in said casing, and a spring adapted to be compressed between said securing member and the end of said bore, said spring being retained in said bore by frictional engagement with the walls of said bore.

5. In a theft preventing device, the combination of a casing member having a pair of transverse bores communicating by a small counterbore extending inward from the first of said bores, with a lock barrel disposed in said first bore, a locking bolt rotatably carried in said counter-bore, said bolt having a groove forming a continuation of the wall of the other bore, and a threaded member rotatably locked in said other bore by said locking bolt.

6. In a theft preventing device, the combination of a casing member having a pair of transverse bores, communicating by a small counterbore extending inward from the first of said bores, with a lock barrel disposed in said first bore, a locking bolt rotatably carried in said counterbore, said bolt having a groove forming a continuation of the wall of the other bore, and a threaded member rotatably locked in said other bore by said locking bolt, said threaded member having an annular groove adapted to rotatably receive said locking bolt.

7. In a theft preventing device, the combination of a casing member having a pair of transverse bores, communicating by a small counterbore extending inward from the first of said bores, with a lock barrel disposed in said first bore, a locking bolt rotatably carried in said counterbore, said bolt having a groove forming a continuation of the wall of the other bore, a threaded member rotatably locked in said other bore by said locking bolt, said threaded member having an annular groove adapted to rotatably receive said locking bolt, and a shoulder on said threaded member determining the registering position of said annular groove and said locking bolt.

8. In a spare wheel lock, the combination of a threaded member having a threaded bore adapted to receive a bolt upon a spare wheel carrier and adapted to engage a wheel secured between said threaded member and carrier, with a casing having a bore adapted to rotatably receive said threaded member, a coil spring secured in said casing by frictional engagement with the walls thereof and adapted to be tensioned between the bottom of said bore and said threaded member, said casing having a transverse bore with a counter-bore communicating with said first mentioned bore, a locking barrel having a rotatable locking bolt in said counter-bore, said locking bolt having a groove adapted to register with the walls of said first mentioned bore and said threaded member having a groove adapted to register with the walls of said counter-bore, said casing comprising an oblong metal member.

In witness whereof, I hereunto subscribe my name this 14th day of May, 1927.

JAMES HARRINGTON